(12) United States Patent
Huang (10) Patent No.: US 10,066,686 B2
(45) Date of Patent: Sep. 4, 2018

(54) BRAKE CALIPER (71) Applicant: Jui-Fa Huang, Changhua County (TW)

(72) Inventor: Jui-Fa Huang, Changhua County (TW)

( * ) Notice: Subject to any disclaimer, the term of this patent is extended or adjusted under 35 U.S.C. 154(b) by 0 days.

(21) Appl. No.: 15/593,191

(22) Filed: May 11, 2017

(65) Prior Publication Data
US 2018/0031060 A1  Feb. 1, 2018

(30) Foreign Application Priority Data

Jul. 26, 2016 (TW) .............................. 105211250 U (51) Int. Cl.
| F16D 55/22 | (2006.01) |
| F16D 65/00 | (2006.01) |
| F16D 55/227 | (2006.01) |
| F16D 65/095 | (2006.01) |
| F16D 65/18 | (2006.01) |
| F16D 55/00 | (2006.01) |
| F16D 121/24 | (2012.01) |
| F16D 125/40 | (2012.01) |
| F16D 125/58 | (2012.01) |
| F16D 127/02 | (2012.01) |

(52) U.S. Cl.
CPC ....... F16D 65/0075 (2013.01); F16D 55/227 (2013.01); F16D 65/095 (2013.01); F16D 65/18 (2013.01); F16D 2055/002 (2013.01); F16D 2055/0091 (2013.01); F16D 2121/24 (2013.01); F16D 2125/40 (2013.01); F16D 2125/582 (2013.01); F16D 2127/02 (2013.01)

(58) Field of Classification Search
CPC ....... F16D 2055/0091; F16D 2055/007; F16D 2055/0045; F16D 2055/0029; F16D 2055/002; F16D 65/0975; F16D 65/0075; F16D 55/24; F16D 55/228; F16D 55/227; F16D 55/2265; F16D 2129/10
See application file for complete search history.

(56) References Cited

U.S. PATENT DOCUMENTS

| 2,983,338 | A | * | 5/1961 | Vansteenkiste | ........... B60T 7/02 |
| | | | | | 188/72.7 |
| 3,182,755 | A | * | 5/1965 | Campagnolo | ......... F16D 55/228 |
| | | | | | 188/106 F |
| 3,321,049 | A | * | 5/1967 | Swift | ...................... F16D 55/22 |
| | | | | | 188/71.9 |
| 2002/0007989 | A1 | * | 1/2002 | Matsuishi | ............... B60T 1/065 |
| | | | | | 188/73.39 |

(Continued)

*Primary Examiner* — Bradley T King
*Assistant Examiner* — Stephen M Bowes
(74) *Attorney, Agent, or Firm* — Ming Chow; Sinorica, LLC (57) ABSTRACT A brake caliper includes a caliper body. The caliper body has a first accommodation trough and a second accommodation trough. The first accommodation trough is provided with at least one piston and two first brake linings pushed by the piston. The second accommodation trough is provided with two second brake linings. The two second brake linings are connected with a drive unit. When the user pedals the brake pedal of a vehicle, the brake master cylinder of the vehicle pushes the piston to link the two first brake linings to clamp both sides of the disc to perform foot brake. When the user activates the electric parking brake of the vehicle, the drive unit will push the two second brake linings to perform electronic hand brake.

7 Claims, 10 Drawing Sheets

(56) References Cited

U.S. PATENT DOCUMENTS

| | | | | |
|---|---|---|---|---|
| 2010/0032250 A1* | 2/2010 | Cantoni | .............. | F16D 55/2262 |
| | | | | 188/72.3 |
| 2015/0021125 A1* | 1/2015 | Nessi | .................... | F16D 55/228 |
| | | | | 188/72.5 |
| 2015/0027821 A1* | 1/2015 | Nessi | .................... | F16D 55/224 |
| | | | | 188/72.3 |
| 2016/0131207 A1* | 5/2016 | Morais | .................. | F16D 55/226 |
| | | | | 188/73.45 |

* cited by examiner

BRAKE CALIPER

FIELD OF THE INVENTION

The present invention relates to a brake caliper of a vehicle, and more particularly to a brake caliper used for an electric parking brake.

BACKGROUND OF THE INVENTION

A disc brake system has excellent brake performance, so it is widely used in various vehicles. In general, the main structure of the disc brake system includes a disc and a caliper body disposed at the outer edge of the disc. The caliper body has an engaging trough corresponding to the disc and a pair of brake linings in the engaging trough. The brake linings are located at both sides of the disc, respectively. The caliper body has a plurality of piston chambers corresponding to the brake linings to accommodate pistons, respectively. The caliper body further has a passage in communication with the piston chambers. The passage is connected with the brake fluid tube of the vehicle. When the user pedals the brake pedal of the vehicle, the brake master cylinder of the vehicle feeds the brake fluid into the passage to push the piston, such that the brake linings are linked to clamp both sides of the disc so as to achieve the purpose of foot brake.

However, in addition to a foot brake function for driving, a vehicle also has a hand brake function for parking. For the caliper to have the hand brake function, the brake linings of the existing caliper are provided with a hook connected with a hand brake line of the vehicle. When the user pulls the hand brake lever, the brake linings are directly pulled by the hand brake line to clamp both sides of the disc so as to achieve the purpose of hand brake. With the development of science and technology, the current hand brake has been developed into an electric parking brake (EPB), so the aforesaid structure cannot be used directly. The foot brake and the hand brake of the aforementioned caliper use the same linings, which accelerates the wear of the brake linings. Besides, when the user releases the foot brake or the hand brake, the brake linings are unable to automatically leave both sides of the disc to cause noise and vibrations. Accordingly, the inventor of the present invention has devoted himself based on his many years of practical experiences to solve these problems.

SUMMARY OF THE INVENTION

The primary object of the present invention is to provide a brake caliper. The brake caliper can be mounted to a vehicle having an electric parking brake, and has the functions of foot brake and electronic hand brake.

In order to achieve the aforesaid object, the brake caliper of the present invention comprises a caliper body, a fixing unit, a linkage unit, a brake lining unit, and a drive unit. The caliper body has a first accommodation trough. A side wall of the first accommodation trough is provided with at least one piston chamber. The piston chamber is provided with a piston therein. The caliper body further has a passage communicating with the piston chamber. One side of the caliper body has a mounting portion. The mounting portion has a second accommodation trough. The fixing unit is mounted to the mounting portion and has a first fixing seat and a second fixing seat. The first fixing seat and the second fixing seat are located at two opposite sides of the second accommodation trough, respectively. The first fixing seat is formed with a plurality of first perforations. The second fixing seat is formed with a plurality of second perforations corresponding to the first perforations. The second fixing seat further has a positioning hole. The linkage unit includes a first linkage seat at an inner side of the first fixing seat, a second linkage seat at an inner side of the second fixing seat, and a third linkage seat at an outside of the second fixing seat. The first linkage seat has a plurality of first through holes corresponding to the first perforations. The second linkage seat has a plurality of second through holes corresponding to the second perforations and a screw hole corresponding to the positioning hole. The third linkage seat has a plurality of third through holes corresponding to the second perforations and a through hole corresponding to the positioning hole. The linkage unit further includes a plurality of linkage pins. The linkage pins are inserted through the first perforations, the second perforations, the first through holes, the second through holes, and the third through holes, respectively. The linkage unit further includes a plurality of elastic members. The elastic members are fitted on the respective linkage pins and located between the first linkage seat and the second linkage seat. The brake lining unit includes two first brake linings disposed in the first accommodation trough and two second brake linings disposed in the second accommodation trough. The two second brake linings are fixed to the first linkage seat and the second linkage seat, respectively. The drive unit includes a positioning seat fixed to an outer outside of the third linkage seat. The positioning seat has a shaft hole corresponding to the through hole. The shaft hole is provided with a drive shaft. One end of the drive shaft is formed with a threaded portion. The threaded portion is inserted through the through hole and screwed to the screw hole. The drive unit further includes a motor fixed to an outer side of the positioning seat. Another end of the drive shaft is connected to the motor.

The brake caliper of the present invention can be mounted to a disc of a vehicle. The caliper body is connected with the brake fluid tube of the vehicle. The drive unit is connected with the electric parking brake of the vehicle. When the user pedals the brake pedal of the vehicle, the brake master cylinder of the vehicle pushes the piston of the caliper body by a hydraulic means, such that the first brake linings are pushed to clamp both sides of the disc so as to achieve the purpose of foot brake. When the user activates the electric parking brake, the drive unit will drive the linkage unit to push the two second brake linings to clamp the two sides of the disc so as to achieve the purpose of electronic hand brake.

DETAILED DESCRIPTION OF THE PREFERRED EMBODIMENTS

Embodiments of the present invention will now be described, by way of example only, with reference to the accompanying drawings.

Figure 1:
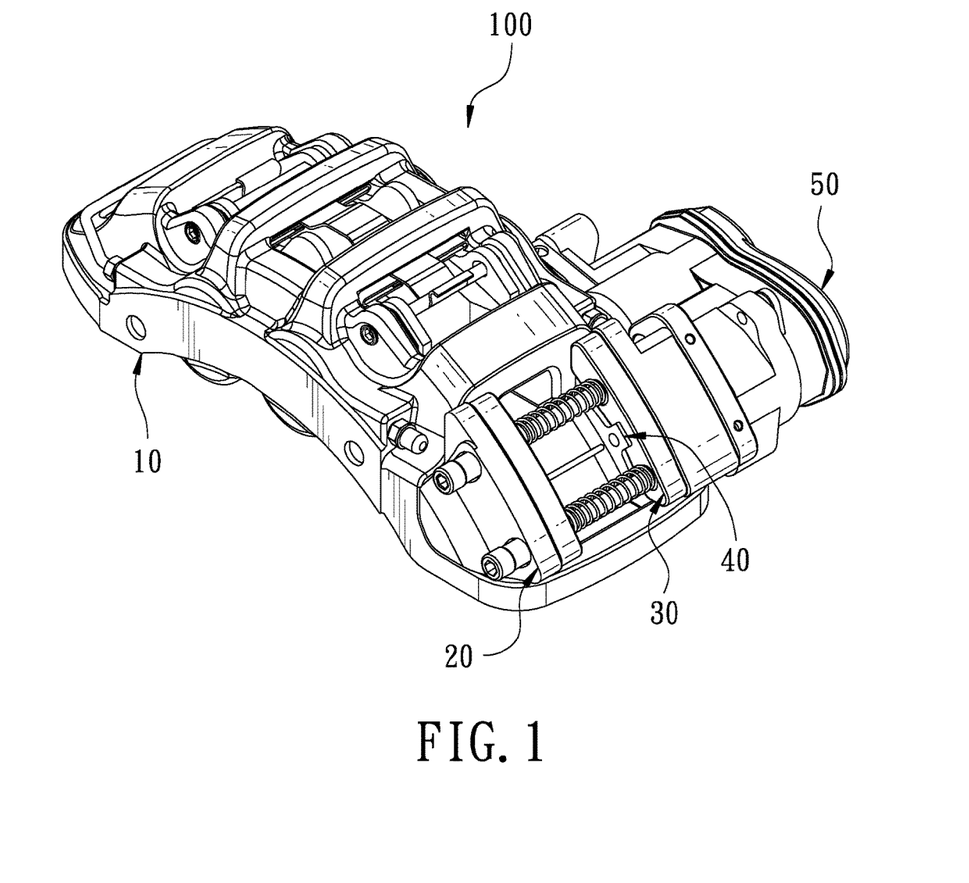
FIG. 1 is a perspective view in accordance with a first embodiment of the present invention.
Figure 2:
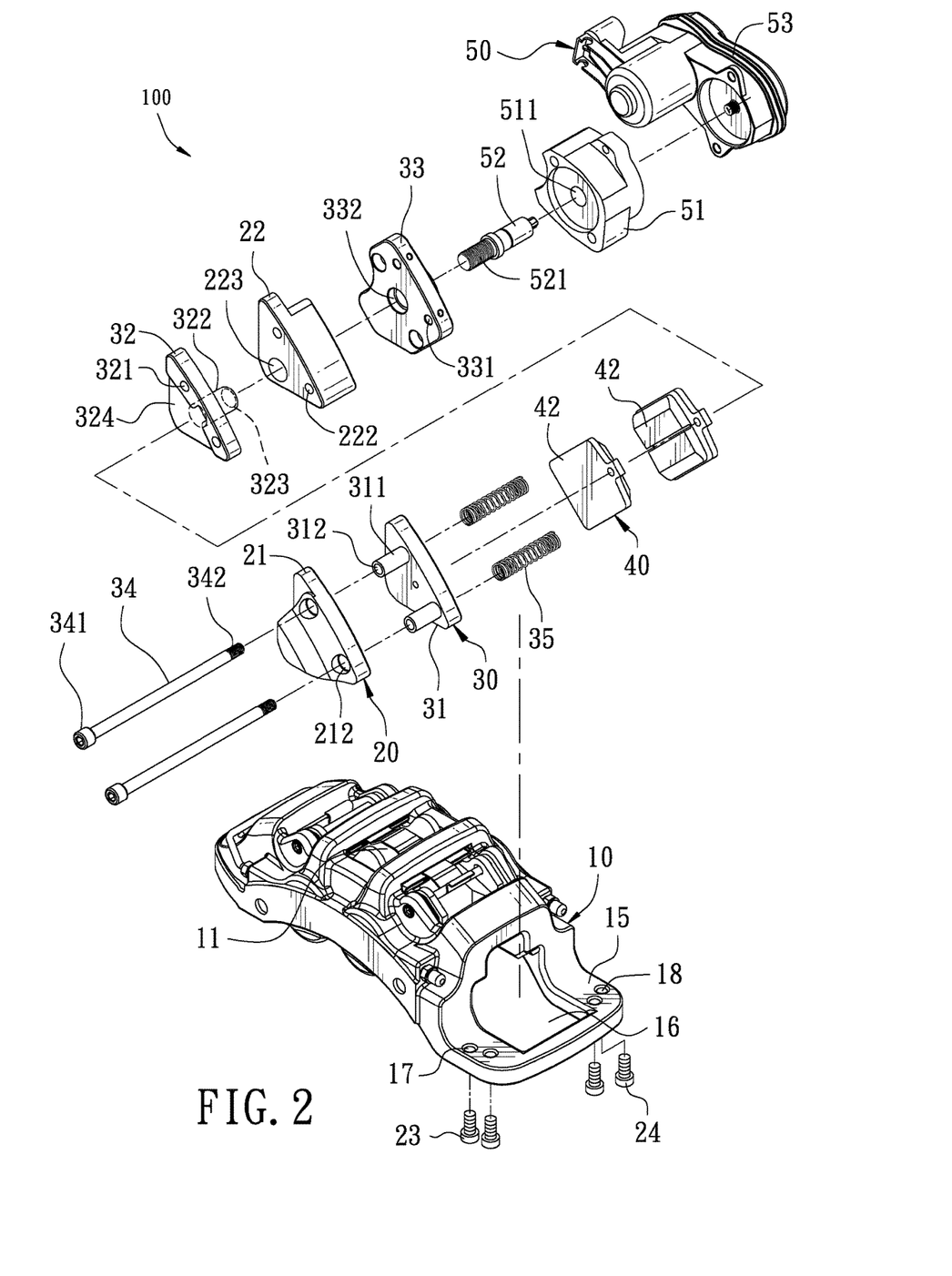
FIG. 2 is an exploded view in accordance with the first embodiment of the present invention.
Figure 3:
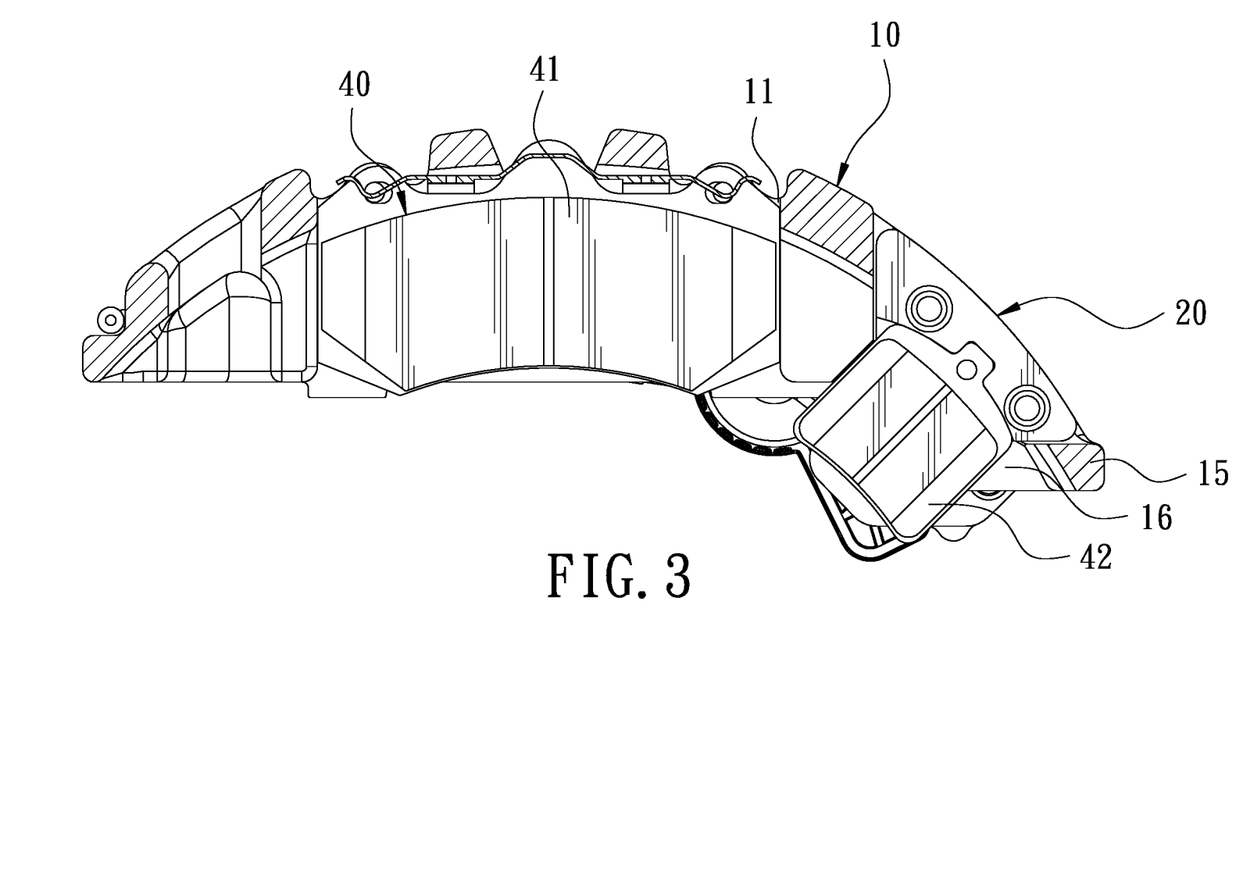
FIG. 3 is a sectional view in accordance with the first embodiment of the present invention.

FIG. 1 is a perspective view in accordance with a first embodiment of the present invention. FIG. 2 is an exploded view in accordance with the first embodiment of the present invention. FIG. 3 is a sectional view in accordance with the first embodiment of the present invention. The present invention discloses a brake caliper 100. The brake caliper 100 comprises a caliper body 10, a fixing unit 20, a linkage unit 30, a brake lining unit 40, and a drive unit 50.

Figure 4:
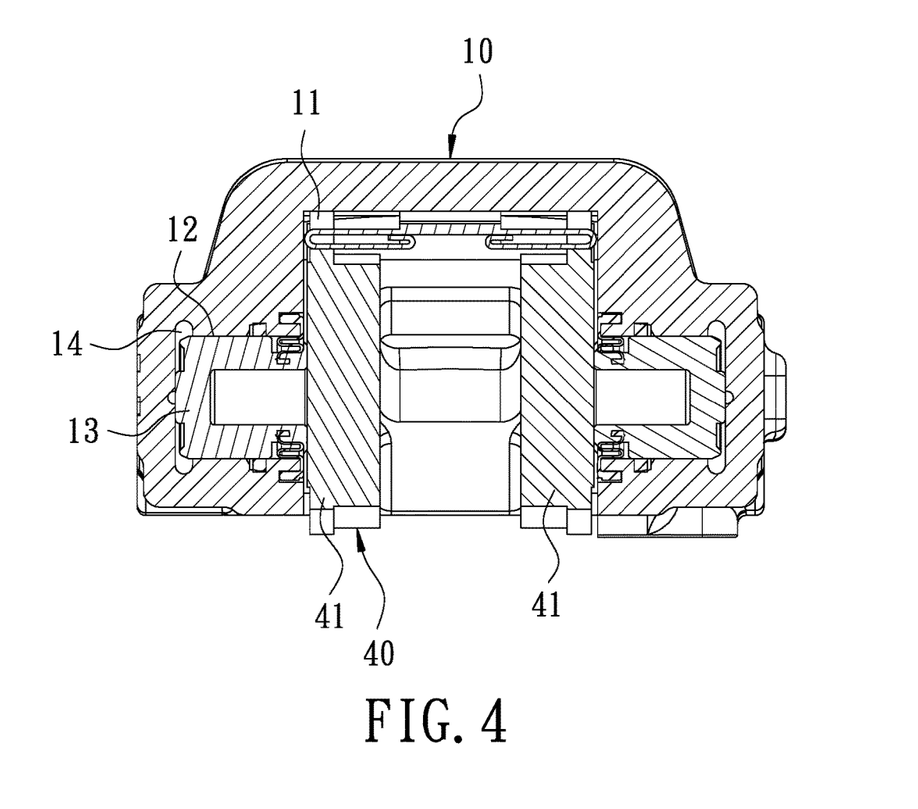
FIG. 4 is a sectional view showing the first accommodation trough in accordance with the first embodiment of the present invention.

The caliper body 10, referring to FIG. 4, has a first accommodation trough 11. A side wall of the first accommodation trough 11 is provided with at least one piston chamber 12. The piston chamber 12 is provided with a piston 13 therein. The caliper body 10 further has a passage 14 communicating with the piston chamber 12. Further, as shown in FIG. 2, one side of the caliper body 10 has a mounting portion 15. The mounting portion 15 has a second accommodation trough 16, at least one first fixing hole 17, and at least one second fixing hole 18.

Figure 5:
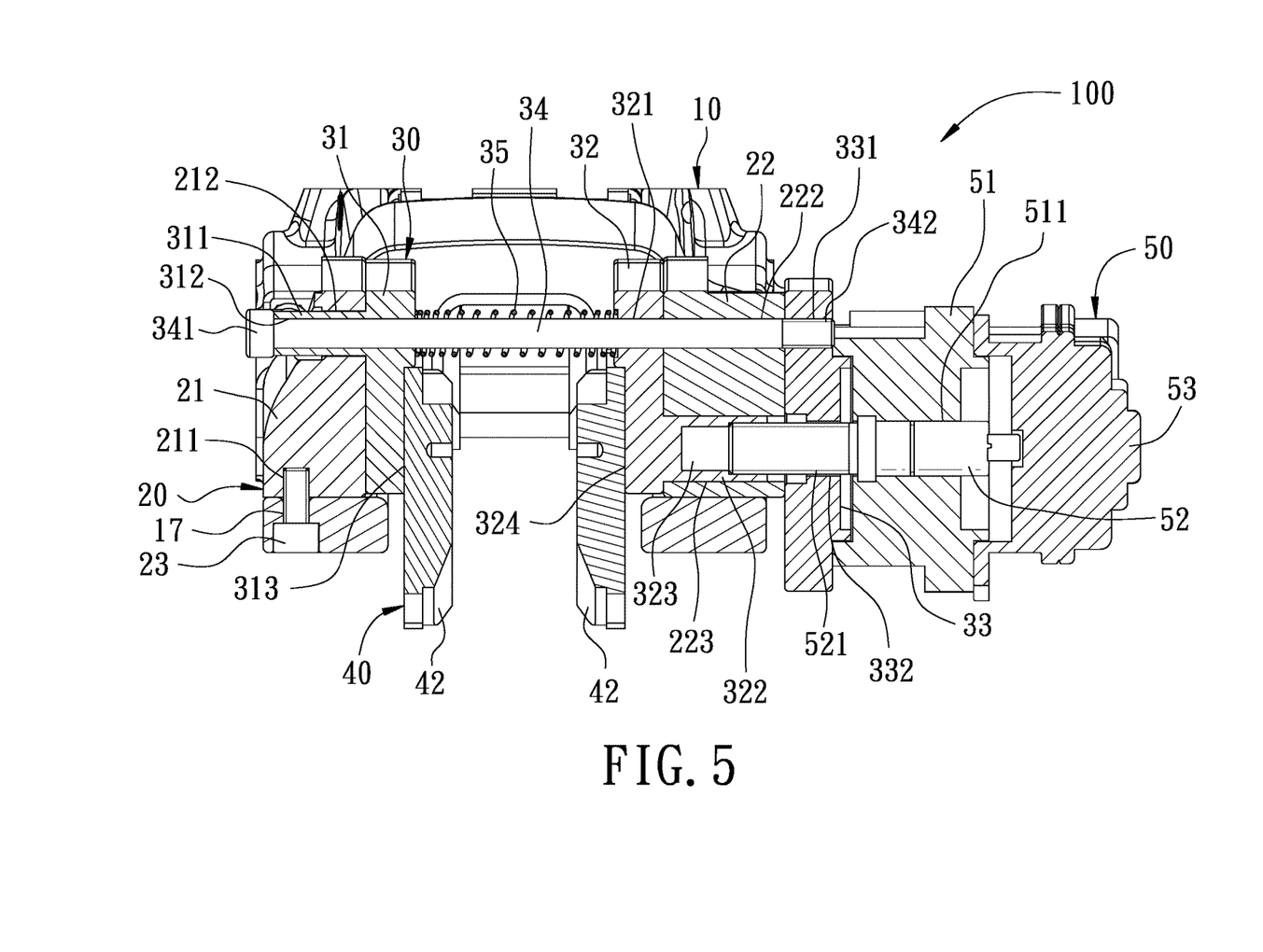
FIG. 5 is a sectional view showing the second accommodation trough in accordance with the first embodiment of the present invention.

The fixing unit 20, referring to FIG. 2 and FIG. 5, is mounted to the mounting portion 15, and has a first fixing seat 21 and a second fixing seat 22. The first fixing seat 21 and the second fixing seat 22 are located at two opposite sides of the second accommodation trough 16, respectively. In this embodiment, the first fixing seat 21 has a first locking hole 211 corresponding to the first fixing hole 17. A first locking member 23 is inserted through the first fixing hole 17 and locked to the first locking hole 211 so as to fix the first fixing seat 21 to the mounting portion 15. The second fixing seat 22 has a second locking hole 221 corresponding to the second fixing hole 18. A second locking member 24 is inserted through the second fixing hole 18 and locked to the second locking hole 221 so as to fix the second fixing seat 22 to the mounting portion 15. In addition, the first fixing seat 21 is formed with a plurality of first perforations 212, and the second fixing seat 22 is formed with a plurality of second perforations 222 corresponding to the first perforations 212. The second fixing seat 22 further has a positioning hole 223.

The linkage unit 30, referring to FIG. 2 and FIG. 5, the linkage unit 30 includes a first linkage seat 31 at an inner side of the first fixing seat 21, a second linkage seat 32 at an inner side of the second fixing seat 22, and a third linkage seat 33 at an outside of the second fixing seat 22. The first linkage seat 31 includes a plurality of first guide posts 311 corresponding to the first perforations 212. The first guide posts 311 each has a first through hole 312. The first linkage seat 31 has a first engaging recess 313. The second linkage seat 32 has a plurality of second through holes 321 corresponding to the second perforations 222 and a second guide post 322 corresponding to the positioning hole 223. The second guide post 322 has a screw hole 323 therein. The second linkage seat 32 has a second engaging recess 324.

The third linkage seat 33 has a plurality of third through holes 331 corresponding to the second perforations 222 and a through hole 332 corresponding to the positioning hole 223. The linkage unit 30 further includes a plurality of linkage pins 34. The linkage pins 34 are inserted through the first perforations 212, the second perforations 222, the first through holes 312, the second through holes 321, and the third through holes 331, respectively. One end of each of the linkage pins 34 is enlarged to form a head portion 341 which abuts against the corresponding first perforation 212. Another end of each of the linkage pins 334 is formed with a locking portion 342. The locking portion 342 is locked to the corresponding third through hole 331. The linkage unit 30 further includes a plurality of elastic members 35. The elastic members 35 are sleeved on the linkage pins respectively 34 and located between the first linkage seat 31 and the second linkage seat 32.

The brake lining unit 40, referring to FIG. 3 to FIG. 5, includes two first brake linings 41 disposed in the first accommodation trough 11 and two second brake linings 42 disposed in the second accommodation trough 16. The two second brake linings 42 are fixed to the first linkage seat 31 and the second linkage seat 32, respectively. In this embodiment, the two second brake linings 42 are fixed to the first engaging recess 313 and the second engaging recess 324, respectively.

The drive unit 50, referring FIG. 2 and FIG. 5, includes a positioning seat 51 fixed to an outer outside of the third linkage seat 33. The positioning seat 51 has a shaft hole 511 corresponding to the through hole 332. The shaft hole 511 is provided with a drive shaft 52. One end of the drive shaft 52 is formed with a threaded portion 521. The threaded portion 521 is inserted through the through hole 332 and screwed to the screw hole 323. The drive unit 50 further includes a motor 53 fixed to an outer side of the positioning seat 51. Another end of the drive shaft 52 is connected to the motor 53.

Figure 6:
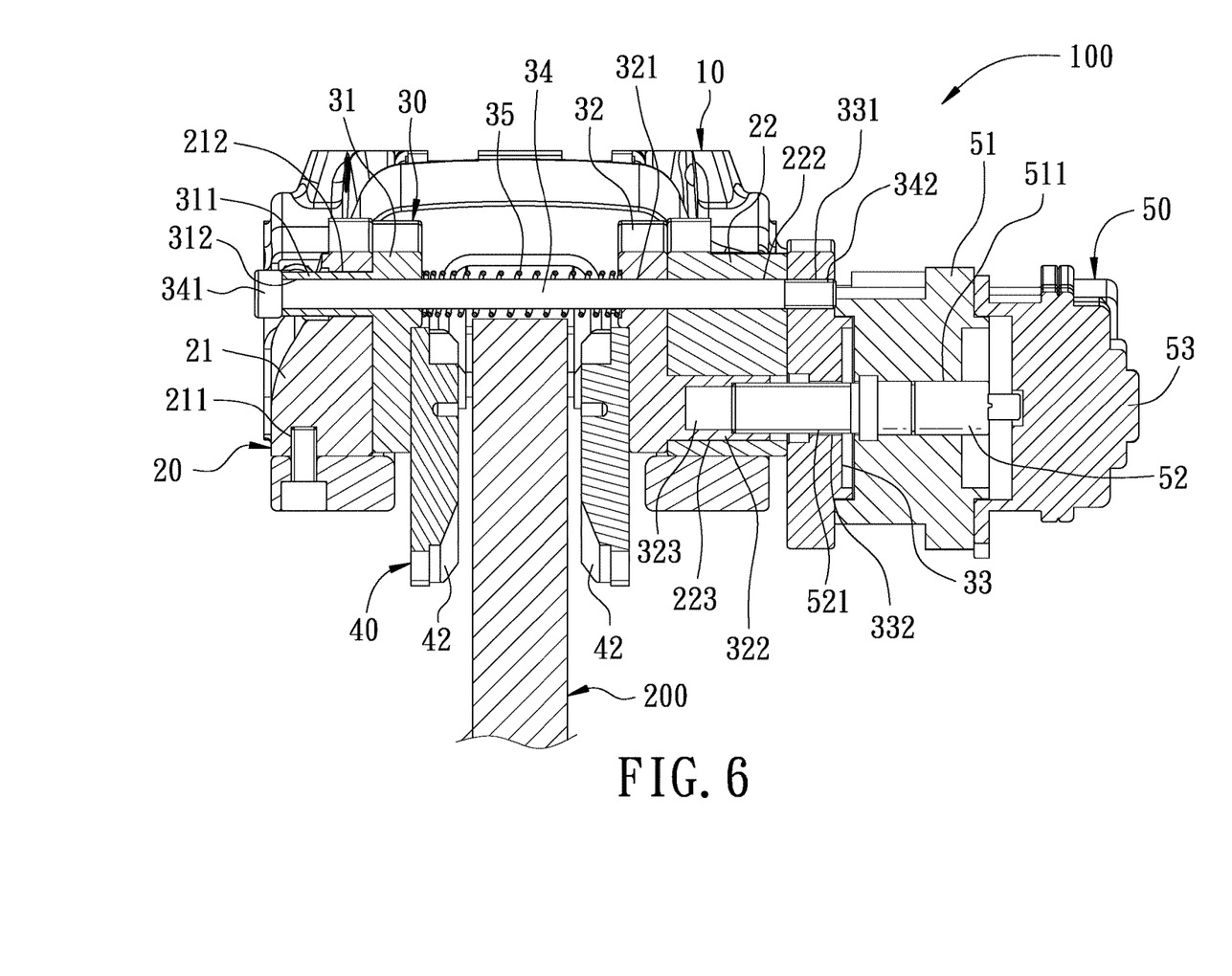
FIG. 6 is a schematic view showing the use of the first embodiment of the present invention.

FIG. 6 is a schematic view showing the use of the first embodiment of the present invention. The brake caliper 100 is mounted to a disc 200 of a vehicle. The passage 14 of the caliper body 10 is connected with the brake fluid tube of the vehicle. The drive unit 50 is connected with the electric parking brake of the vehicle. When the user pedals the brake pedal of the vehicle, as shown in FIG. 4, the brake master cylinder of the vehicle feeds the brake fluid into the passage 14 and the brake fluid flows along the passage 14 to push the piston 13, such that the first brake linings 41 are linked to clamp both sides of the disc 200 by a hydraulic means so as to achieve the purpose of foot brake. This operation and technical principle are the same as those of the conventional brake caliper and won't be described hereinafter.

Figure 7:
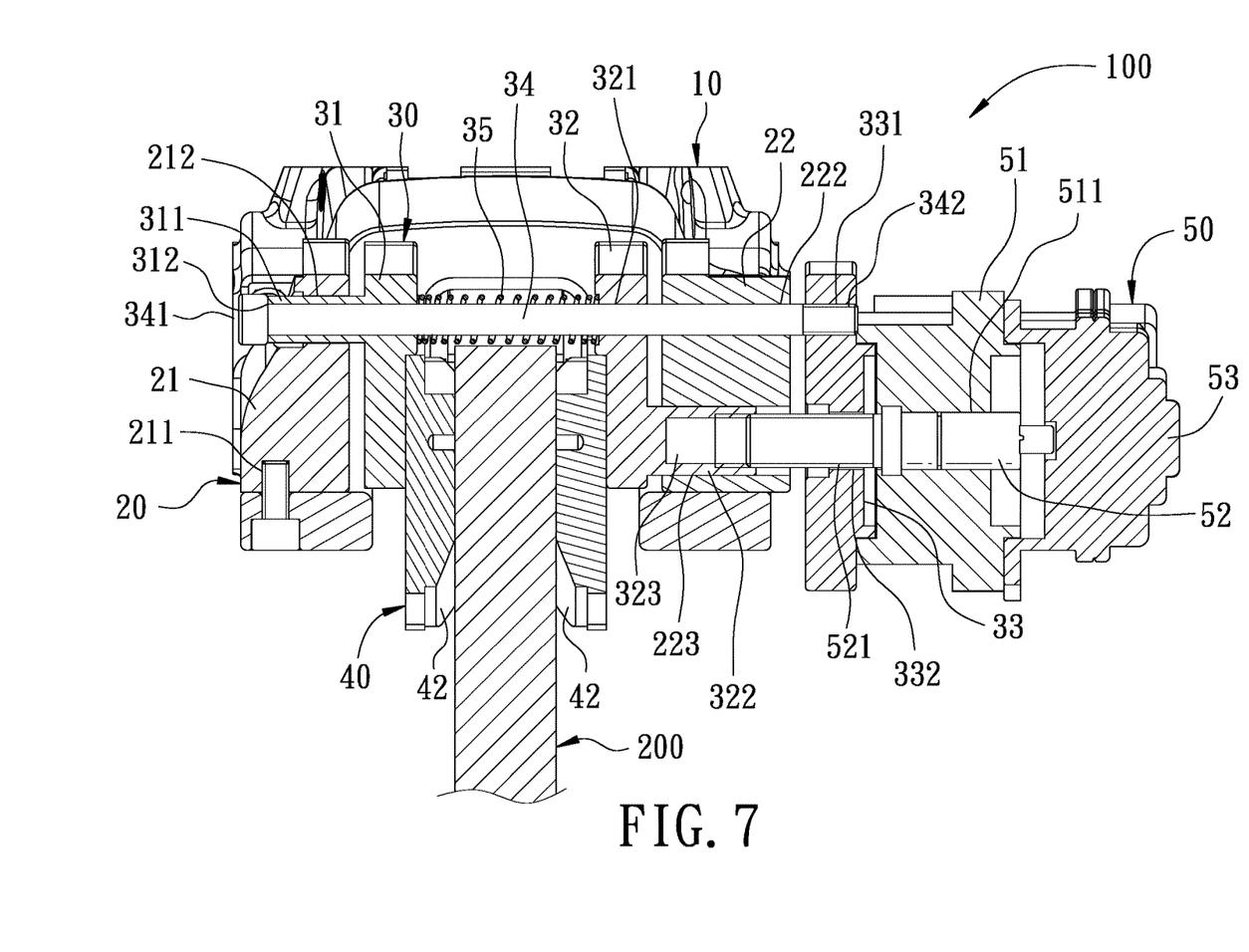
FIG. 7 is a schematic view showing the operation of the first embodiment of the present invention.

Referring to FIG. 7, when the user activates the electric parking brake, the motor 53 of the drive unit 50 will drive the drive shaft 52 to turn. The positioning seat 51 is fixed to the third linkage seat 33, and the threaded portion 521 of the drive shaft 52 is screwed into the screw hole 323 of the second linkage seat 32. When the threaded portion 521 of the drive shaft 52 is rotated out of the screw hole 323, the second linkage seat 32 is moved outward relative to third linkage seat 33, so that the second linkage seat 32 urges the corresponding second brake lining 42 to lean against one side of the disc 200. Through the linkage pins 34, the third linkage seat 33 pulls the first linkage seat 31 to move toward the disc 200, so that the first linkage seat 31 urges the other corresponding second brake lining 42 to lean against the other side of the disc 200. The two second brake linings 42 are actuated to clamp the two sides of the disc 200 so as to achieve the purpose of electronic hand brake.

When the user releases the electric parking brake, the motor 53 of the drive unit 50 will drive the drive shaft 52 to rotate in the reverse direction, i.e., the drive shaft 52 is rotated into the screw hole 323, while the elastic members 35 provides an elastic force to push the first linkage seat 31 to move outward relative to the second linkage seat 32. The third leakage seat 33 is moved by the leakage pins 34 to move toward the disc 200, and the two second linings 42 are moved away from both sides the disc 200 so as to achieve the purpose of releasing electronic hand brake. The design of the first guide posts 311 and the second guide post 322 allows the first linkage seat 31 and the second linkage seat 32 to slide more smoothly.

Thereby, the brake caliper 100 of the present invention can be used for a vehicle having an electric parking brake, and has the functions of foot brake and electronic hand brake, with the first brake linings 41 for foot brake and with the second brake linings 42 for hand brake, that is, the foot brake and the hand brake are two separate systems that do not interfere with each other, so that there is no problem of noise or vibrations.

Figure 8:
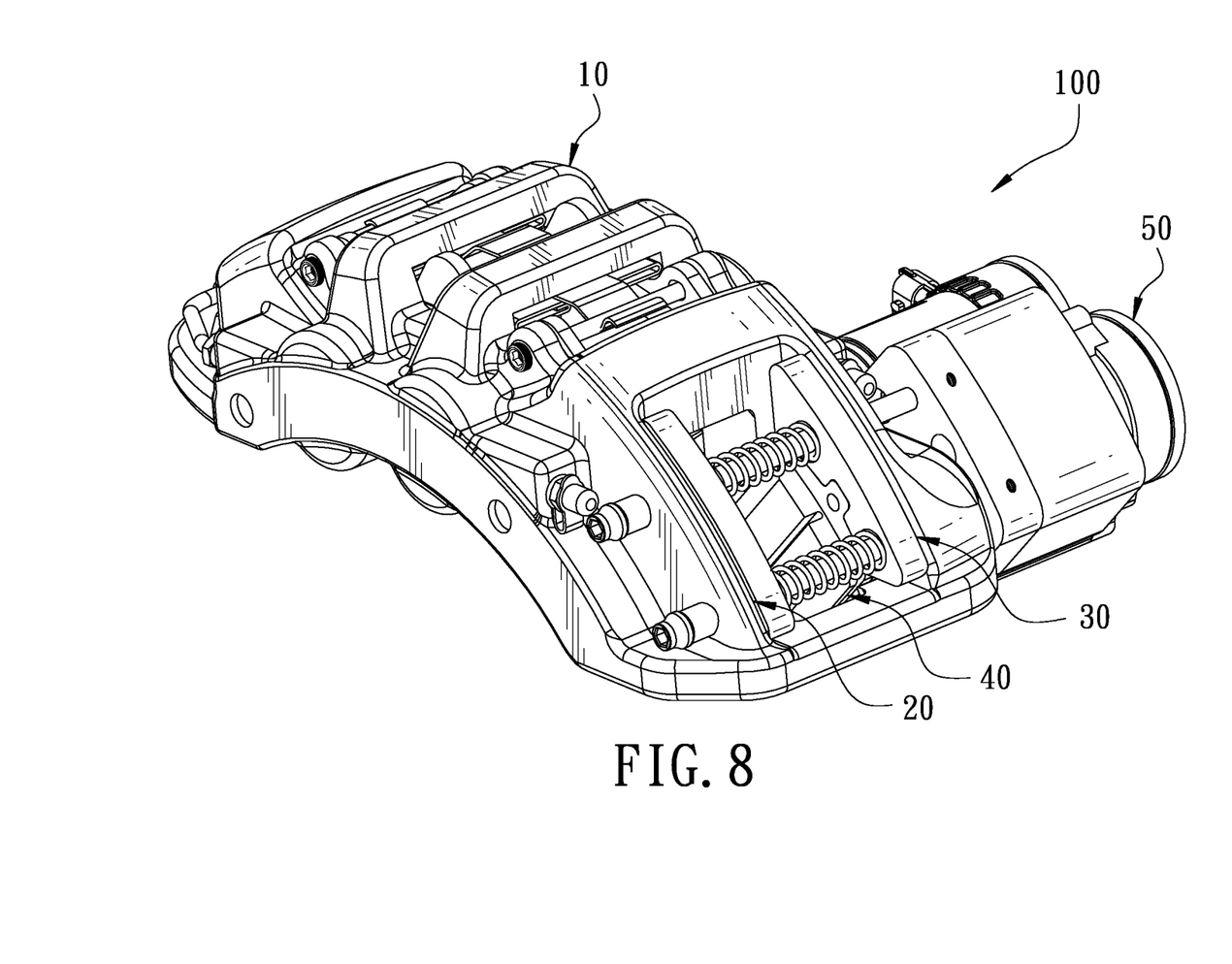
FIG. 8 is a perspective view in accordance with a second embodiment of the present invention.
Figure 9:
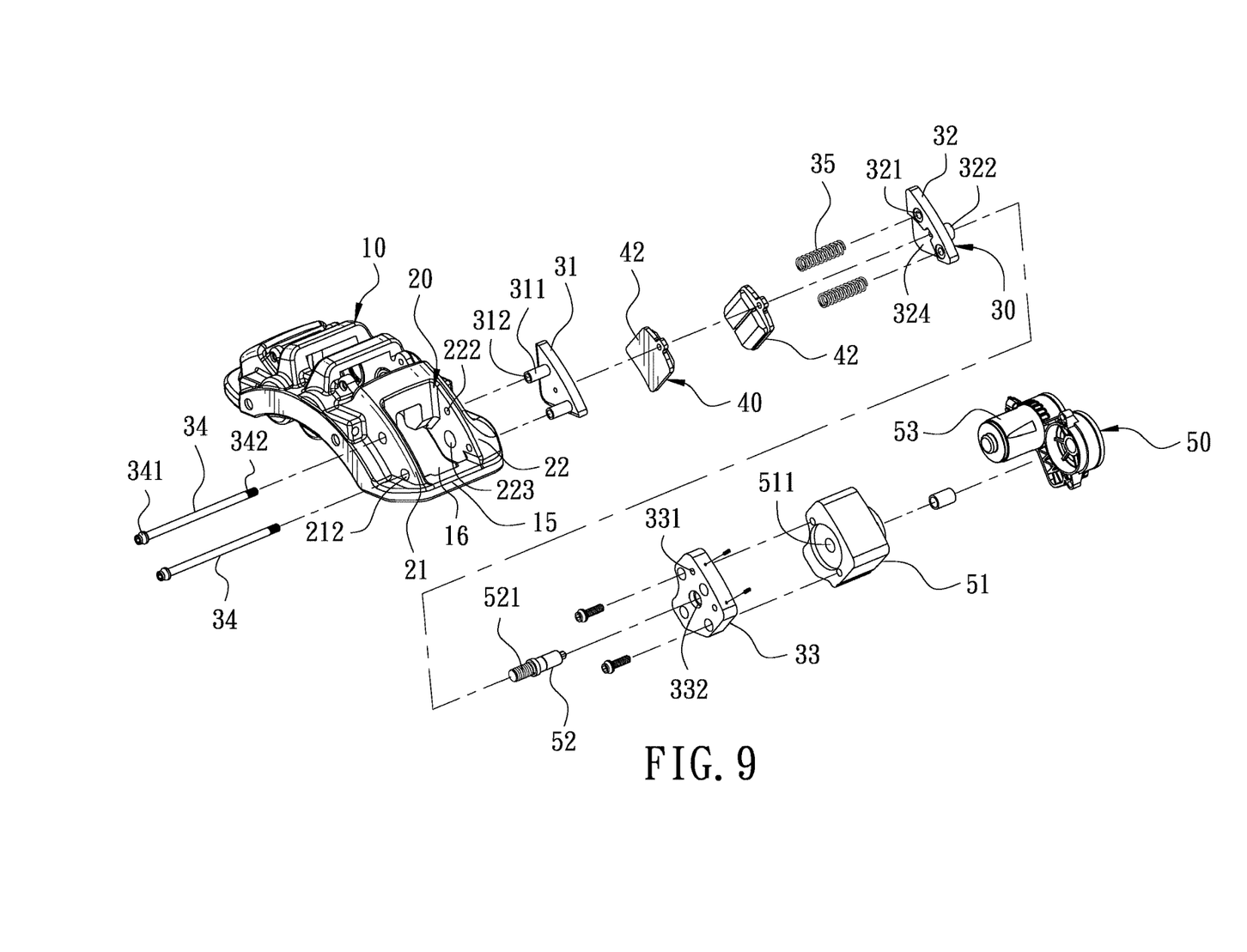
FIG. 9 is an exploded view in accordance with the second embodiment of the present invention.
Figure 10:
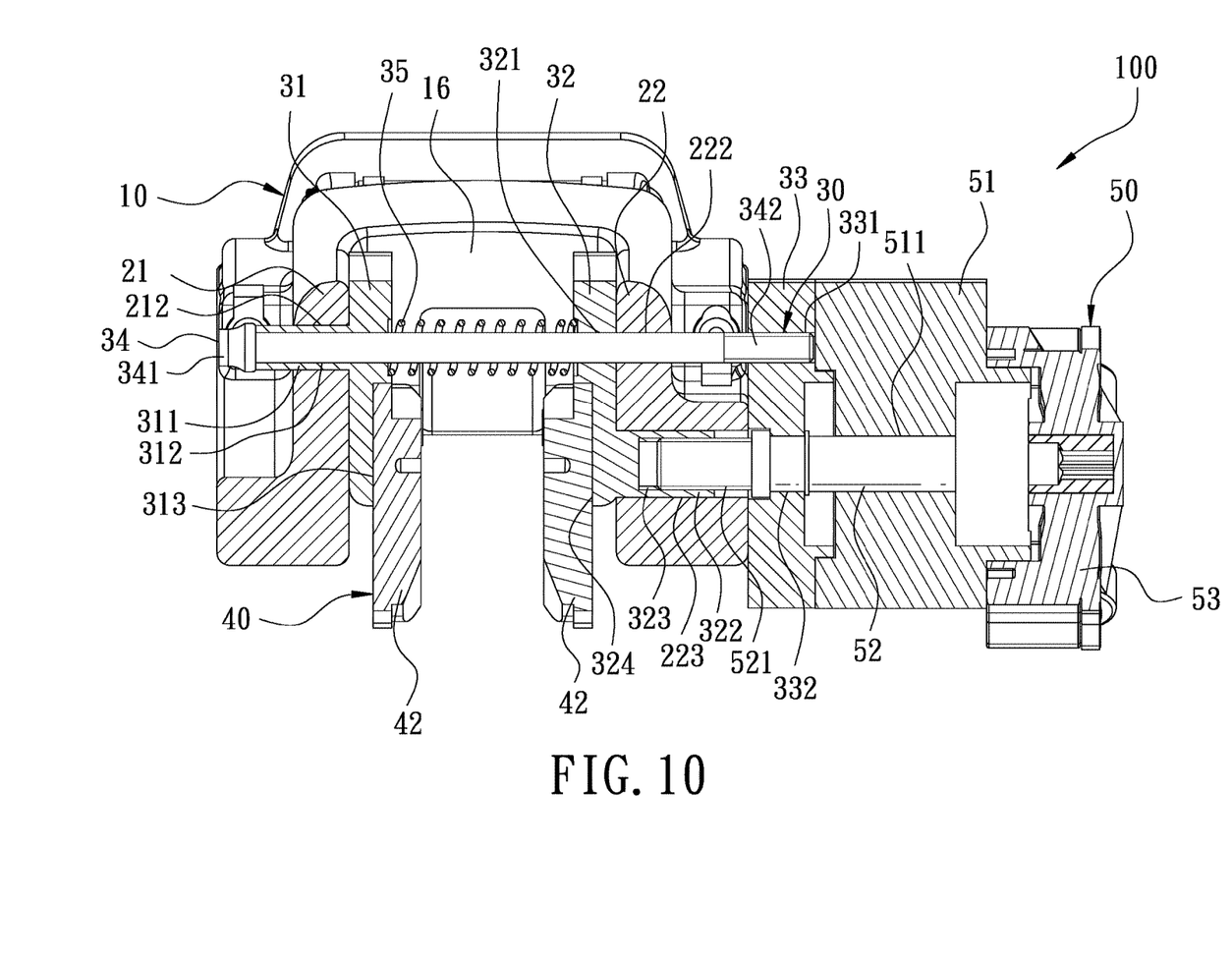
FIG. 10 is a sectional view in accordance with the second embodiment of the present invention.

FIG. 8 is a perspective view in accordance with a second embodiment of the present invention. FIG. 9 is an exploded view in accordance with the second embodiment of the present invention. FIG. 10 is a sectional view in accordance with the second embodiment of the present invention. The second embodiment is substantially similar to the first embodiment with the exceptions described hereinafter. The first fixing seat 21 and the second fixing seat 22 of the fixing unit 20 are integrally formed with the mounting portion 15 of the caliper body 10, and are located at two opposite sides of the second accommodation trough 16 respectively, thereby facilitating production assembly and improving accuracy of the installation.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A brake caliper, comprising:
   a caliper body, having a first accommodation trough, a side wall of the first accommodation trough being provided with at least one piston chamber, the piston chamber being provided with a piston therein, the caliper body further having a passage communicating with the piston chamber, one side of the caliper body having a mounting portion, the mounting portion having a second accommodation trough;
   a fixing unit, mounted to, or integrally formed with, the mounting portion and having a first fixing seat and a second fixing seat, the first fixing seat and the second fixing seat being located at two opposite sides of the second accommodation trough respectively; the first fixing seat being formed with a plurality of first perforations, the second fixing seat being formed with a plurality of second perforations corresponding to the first perforations, the second fixing seat further having a positioning hole;
   a linkage unit, including a first linkage seat at an inner side of the first fixing seat, a second linkage seat at an inner side of the second fixing seat, and a third linkage seat at an outside of the second fixing seat; the first linkage seat having a plurality of first through holes corresponding to the first perforations; the second linkage seat having a plurality of second through holes corresponding to the second perforations and a screw hole corresponding to the positioning hole; the third linkage seat having a plurality of third through holes corresponding to the second perforations and a through hole corresponding to the positioning hole; the linkage unit further including a plurality of linkage pins, the linkage pins being inserted through the first perforations, the second perforations, the first through holes, the second through holes, and the third through holes respectively; the linkage unit further including a plurality of elastic members, the elastic members being fitted on the respective linkage pins and located between the first linkage seat and the second linkage seat;
   a brake lining unit, including two first brake linings disposed in the first accommodation trough and two second brake linings disposed in the second accommodation trough; the two second brake linings being fixed to the first linkage seat and the second linkage seat, respectively; and
   a drive unit, including a positioning seat fixed to an outer outside of the third linkage seat, the positioning seat having a shaft hole corresponding to the through hole, the shaft hole being provided with a drive shaft, one end of the drive shaft being formed with a threaded portion, the threaded portion being inserted through the through hole and screwed to the screw hole, the drive unit further including a motor fixed to an outer side of the positioning seat, another end of the drive shaft being connected to the motor.

2. The brake caliper as claimed in claim 1, wherein the mounting portion has at least one first fixing hole and at least one second fixing hole, the first fixing seat has a first locking hole corresponding to the first fixing hole, a first locking member is inserted through the first fixing hole and locked to the first locking hole so as to fix the first fixing seat to the mounting portion, the second fixing seat has a second locking hole corresponding to the second fixing hole, and a second locking member is inserted through the second fixing hole and locked to the second locking hole so as to fix the second fixing seat to the mounting portion.

3. The brake caliper as claimed in claim 1, wherein the first fixing seat and the second fixing seat of the fixing unit are integrally formed with the mounting portion of the caliper body and located at the two opposite sides of the second accommodation trough, respectively.

4. The brake caliper as claimed in claim 1, wherein the first linkage seat includes a plurality of first guide posts corresponding to the first perforations, and the first guide posts are formed with the first through holes.

5. The brake caliper as claimed in claim 1, wherein the second linkage seat has a second guide post corresponding to the through hole, and the second guide post is formed with the screw hole.

6. The brake caliper as claimed in claim 1, wherein one end of each of the linkage pins is enlarged to form a head portion which abuts against a corresponding one of the first perforations, another end of each of the linkage pins is formed with a locking portion, and the locking portion is locked to a corresponding one of the third through holes.

7. The brake caliper as claimed in claim 1, wherein the first linkage seat has a first engaging recess, the second linkage seat has a second engaging recess, and the two second brake linings are fixed to the first engaging recess and the second engaging recess, respectively.

* * * * *